(12) United States Patent
Maienschein et al.

(10) Patent No.: US 7,481,050 B2
(45) Date of Patent: Jan. 27, 2009

(54) HYDRODYNAMIC TORQUE CONVERTER

(75) Inventors: Stephan Maienschein, Baden-Baden (DE); Lutz Ische, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 180 days.

(21) Appl. No.: 11/506,037

(22) Filed: Aug. 17, 2006

(65) Prior Publication Data

US 2007/0074942 A1    Apr. 5, 2007

(30) Foreign Application Priority Data

Sep. 30, 2005   (DE) .................. 10 2005 047 108

(51) Int. Cl.
*F16H 45/02*   (2006.01)
*F16H 41/00*   (2006.01)

(52) U.S. Cl. ........................ 60/330; 192/3.29
(58) Field of Classification Search .............. 60/330; 192/3.29; 416/180, 197 C
See application file for complete search history.

(56) References Cited

U.S. PATENT DOCUMENTS

| 4,926,988 | A | 5/1990 | Kundermann | |
|---|---|---|---|---|
| 5,215,173 | A | * 6/1993 | Gimmler | 192/3.29 |
| 6,026,941 | A | * 2/2000 | Maienschein et al. | 192/3.29 |
| 6,216,837 | B1 | * 4/2001 | Maienschein et al. | 192/3.29 |
| 6,561,330 | B2 | * 5/2003 | Maienschein et al. | 192/3.29 |
| 6,926,131 | B1 | * 8/2005 | Arhab et al. | 192/3.29 |
| 7,011,196 | B2 | * 3/2006 | Sudau | 192/3.29 |

FOREIGN PATENT DOCUMENTS

DE    38 23 210    1/1990

* cited by examiner

*Primary Examiner*—Thomas E Lazo
(74) *Attorney, Agent, or Firm*—Simpson & Simpson, PLLC

(57) ABSTRACT

The invention relates to a hydrodynamic torque converter with a housing which comprises a wall which is on the driving side, where a connecting plate is fastened to the housing wall and comprises several mounting locations for connecting the hydrodynamic torque converter to a drive unit, the mounting locations being distributed over the circumference of the connecting plate and in the mounted state of the hydrodynamic torque converter being fastened at corresponding mounting locations of the drive unit. In order to provide a hydrodynamic torque converter which can be produced economically and has a long service lifetime, for each two mounting locations the connecting plate comprises, between them in the circumferential direction, a fastening area with which the connecting plate is fastened to the housing wall which is on the driving side.

10 Claims, 2 Drawing Sheets

HYDRODYNAMIC TORQUE CONVERTER

CROSS REFERENCE TO RELATED APPLICATIONS

This patent application Claims priority of German Patent Application No. 10 2005 047 108.0, filed on Sep. 30, 2005, which application is incorporated herein by reference.

FIELD OF THE INVENTION

The invention relates to a hydrodynamic torque converter with a housing which comprises a wall which is on the driving side, where a connecting plate is fastened to the housing wall and comprises several mounting locations for connecting the hydrodynamic torque converter to a drive unit, the mounting locations being distributed over the circumference of the connecting plate and in the mounted state of the hydrodynamic torque converter being fastened at corresponding mounting locations of the drive unit.

BACKGROUND OF THE INVENTION

In traditional torque converters, as are known, for example, from the German Patent Specification DE 38 23 210 C2, the connecting plate has essentially the structure of a circular annular disk comprising several mounting locations, the circular annular disk being welded, both radially outwards and radially inwards, to the housing wall which is on the driving side.

SUMMARY OF THE INVENTION

It is the objective of the present invention to provide a hydrodynamic torque converter which can be produced economically and has a long service lifetime.

In a hydrodynamic torque converter with a housing which comprises a wall which is on the driving side, where a connecting plate is fastened to the housing wall and comprises several mounting locations for connecting the hydrodynamic torque converter to a drive unit, the mounting locations being distributed over the circumference of the connecting plate and in the mounted state of the hydrodynamic torque converter being fastened at corresponding mounting locations of the drive unit, the objective is realized by the fact that, for each two mounting locations the connecting plate comprises, between them in the circumferential direction, a fastening area with which the connecting plate is fastened to the housing wall which is on the driving side. Due to the fastening areas disposed between each two mounting locations, the connecting plate's rigidity in the circumferential direction in the mounted state is clearly increased with respect to traditional torque converters.

In a preferred embodiment, the hydrodynamic torque converter mounting locations each comprise at least one mounting surface, the mounting surface being spaced from the housing wall which is on the driving side and extending radially outwards from a connecting annular disk. This offers the advantage that the intermediate space, which is present in the axial direction between the mounting surface, or the part of the connecting plate with the mounting surface, and the housing wall, which is on the driving side, is accessible radially outwards.

In an additional preferred embodiment, the hydrodynamic torque converter comprises two preferably oblique cupping surfaces running out from the mounting surface laterally in the circumferential direction, the cupping surfaces each becoming a fastening flange and extending, in the circumferential direction, between two mounting surfaces. The fastening flange serves to fasten the connecting plate to the housing wall which is on the driving side, the fastening being, in the circumferential direction, between the mounting locations. The connecting plate's rigidity in the circumferential direction is increased by the cupping surfaces, which can also be formed so as to be curved.

In an additional preferred embodiment, a hydrodynamic torque converter wherein radially outwards the fastening flange is welded to the housing wall which is on the driving side. The weld seam runs, in the circumferential direction, between the mounting locations and is interrupted in the area of the mounting locations.

In an additional preferred embodiment, a hydrodynamic torque converter wherein the fastening flange is connected by rivets to the housing wall which is on the driving side. Preferably, riveted studs are set out from the housing wall which is on the driving side, the riveted studs serving not only to fasten the connecting plate but rather also to center the connecting plate during mounting.

In an additional preferred embodiment, a hydrodynamic torque converter wherein the connecting plate is spaced in the axial direction from the housing wall which is on the driving side. The connecting plate's essentially cup-shaped form resulting therefrom has proven itself particularly advantageous in the framework of the present invention.

In an additional preferred embodiment, a hydrodynamic torque converter wherein the connecting annular disk is connected as one piece to the fastening flange by an additional cupping surface. Preferably, the additional cupping surface extends obliquely from the inside outwards in the radial direction.

In an additional preferred embodiment, a hydrodynamic torque converter wherein radially inwards the connecting annular disk is welded to the housing wall which is on the driving side. The weld seam is preferably formed so as to be continuous but can also be interrupted.

In an additional preferred embodiment, a hydrodynamic torque converter wherein the connecting annular disk is connected by rivets to the housing wall which is on the driving side. Preferably, riveted studs are set out from the housing wall which is on the driving side, the riveted studs serving not only to fasten the connecting plate but rather also to center the connecting plate during mounting.

In an additional preferred embodiment, a hydrodynamic torque converter wherein between the mounting surface and the housing wall which is on the driving side a nut is fastened to the connecting plate. Preferably, the connection of the nut will already have been done before the mounting of the connecting plate on the housing wall, which is on the driving side.

BRIEF DESCRIPTION OF THE DRAWINGS

Additional advantages, features, and details of the invention follow from the following description, in which different embodiment examples are described in detail with reference to the drawings. In addition, each of the features mentioned in the claims and in the description can be significant for the invention, by itself alone or in any combination with the others, wherein:

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
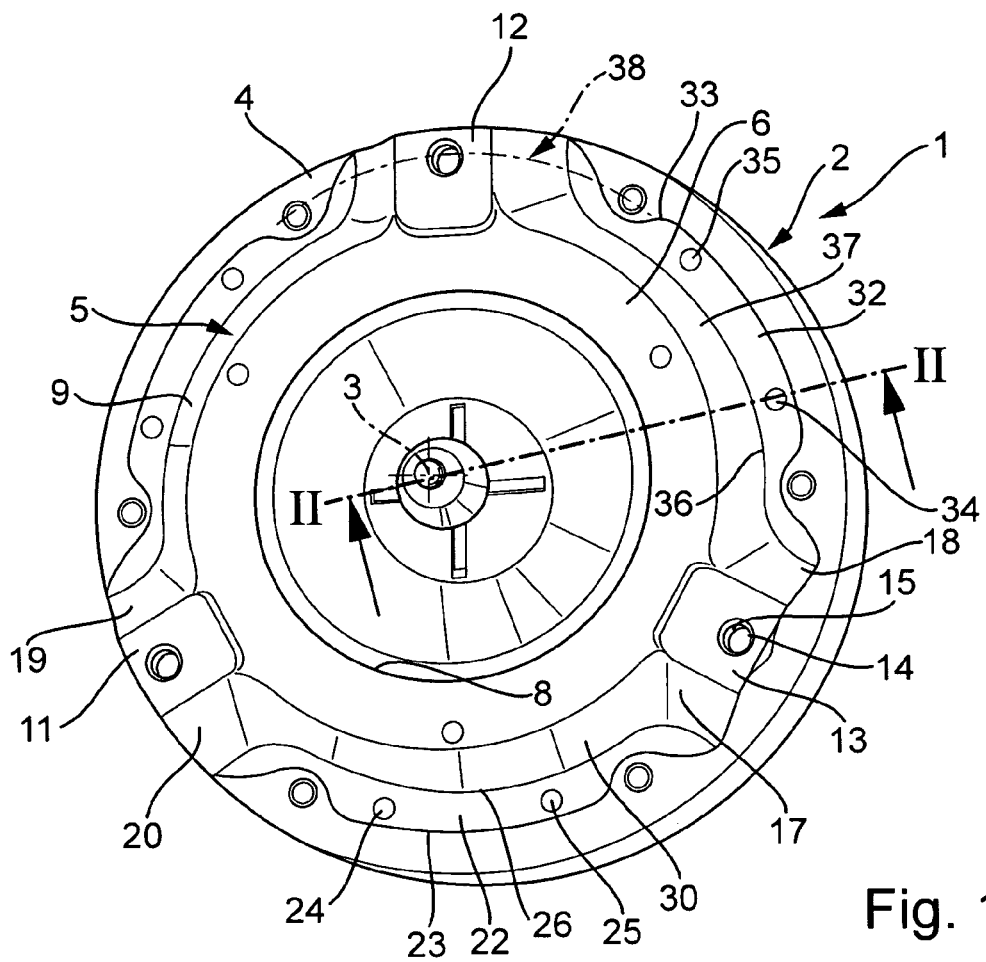
FIG. 1 is a perspective view of a hydrodynamic torque converter according to the present invention.

In FIG. 1, hydrodynamic torque converter 1 with axis or rotation 3 is represented in perspective. Hydrodynamic torque converter 1 has housing 2 with wall 4, which is on the driving side and a wall, which is on the driven side. The phrases "on the driving side" and "on the driven side" relate to an internal combustion engine which forms the drive mechanism in the drive train of a motor vehicle and which is disposed in FIG. 1 on one side of hydrodynamic torque converter 1, specifically the side facing the observer. Housing wall 4, which is on the driving side, is connected, in such a manner that it is fixed against rotation, to a drive shaft (not represented), in particular a crankshaft, of the internal combustion engine. The housing wall, which is on the driven side, is combined in one structural unit with a pump wheel of hydrodynamic torque converter 1.

Between the pump wheel and housing wall 4 which is on the driving side a turbine wheel is disposed in a known manner, the turbine wheel being connected in the direction radially inwards to an input shaft of a transmission in such a manner that it is fixed against rotation. Between the turbine wheel and the pump wheel a stator can be disposed. The design and function of a hydrodynamic torque converter are assumed to be known and thus not explained further in the following.

Connecting plate 5, which comprises connecting annular disk 6, is fastened to housing wall 4, which is on the driving side. Connecting annular disk 6 has the form of a circular annular disk with radially inner circumferential edge 8, which is bent toward housing wall 4, which is on the driving side. Radially outwards, connecting annular disk 6 comprises outer circumferential edge 9 from which three mounting surfaces 11, 12, and 13 extend radially outwards. Three mounting surfaces 11, 12, and 13 are distributed uniformly over the circumference of connecting annular disk 6.

Mounting surfaces 11, 12, and 13 are each formed so as to be essentially rectangular and each comprise a through hole, of which through holes only through hole 14 in mounting surface 13 is provided with a reference number. In the axial direction, that is, in the direction of axis of rotation 3, mounting surface 13 is spaced from housing wall 4, which is on the driving side. In the intermediate space between mounting surface 13 and housing wall 4, which is on the driving side, nut 15 is fastened to the underside of mounting surface 13. Nut 15 serves to receive a shaft of a screw, with whose aid a corresponding mounting surface of the drive unit can be fastened to mounting surface 13 of hydrodynamic torque converter 1.

Seen in the circumferential direction, two cupping surfaces 17, 18 run out laterally from mounting surface 13 and extend up to housing wall 4 which is on the driving side. The angles made by cupping surfaces 17, 18 and mounting surface 13 are preferably greater than 90° but less than 180°. Preferably, the angles lie in the range of 120° to 160°. Mounting surfaces 11, 12 are formed in the same manner as mounting surface 13. Thus, two cupping surfaces 19, 20 also extend from mounting surface 11 to housing wall 4, which is on the driving side. Cupping surface 17, which runs out from mounting surface 13, and cupping surface 20, which runs out from mounting surface 11, are connected as one piece to fastening flange 22 which, between mounting surfaces 11, 13, abuts housing wall 4 which is on the driving side. Radially outwards, fastening flange 22 comprises edge area 23, which according to one embodiment example of the present invention is welded to housing wall 4, which is on the driving side. Alternatively or in addition, fastening flange 22 can be connected at fastening points 24, 25 by fastening means such as rivets or by welding as one piece to housing wall 4 which is on the driving side. Radially inwards, fastening flange 22 comprises edge area 26 at which fastening flange 22 is connected as one piece to cupping surface 30. Cupping surface 30 extends from fastening flange 22 to radially outer circumferential edge 9 of connecting annular disk 6 and is connected as one piece to it. Cupping surface 30 extends, in the circumferential direction, between cupping surfaces 17 and 20. Connecting plate 5 is formed between mounting surfaces 11, 12 and 12, 13 just as between mounting surfaces 13, 11.

Between mounting surfaces 12 and 13 fastening flange 32 extends which abuts housing wall 4, which is on the driving side, just as fastening flange 22 does. Fastening flange 32 comprises radially outer edge area 33 at which fastening flange 32 can be welded to housing wall 4, which is on the driving side. Moreover, at fastening flange 32 additional connection points 34 and 35 are indicated. Furthermore, fastening flange 32 comprises radially inner edge area 36, which is connected as one piece to connecting annular disk 6 by cup surface 37. In the area of mounting surface 12 partial circle 38 is indicated on which the through hole in mounting surface 12 is disposed. Partial circle 38 has approximately the same diameter as radially outer edge area 33 of fastening flange 32.

Figure 2:
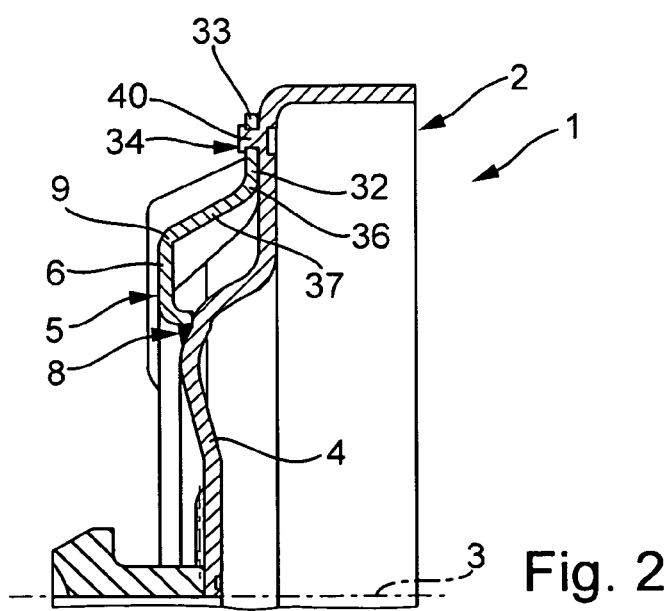
FIG. 2 is a partial cross-sectional view taken along line II-II in FIG. 1.

In FIG. 2 the view of a section along the line II-II in FIG. 1 is represented. In the sectional view one sees that at connection point 34, riveted stud 40 stands out from housing wall 4 which is on the driving side, the riveted stud extending through a corresponding through hole in fastening flange 32. Riveted stud 40 and at least one (not represented in the section) additional riveted stud serves to fasten fastening flange 32 to housing wall 4 which is on the driving side. Radially inwards, connecting plate 5 is welded at inner circumferential edge 8 of connecting annular disk 6 to housing wall 4, which is on the driving side.

Figure 3:
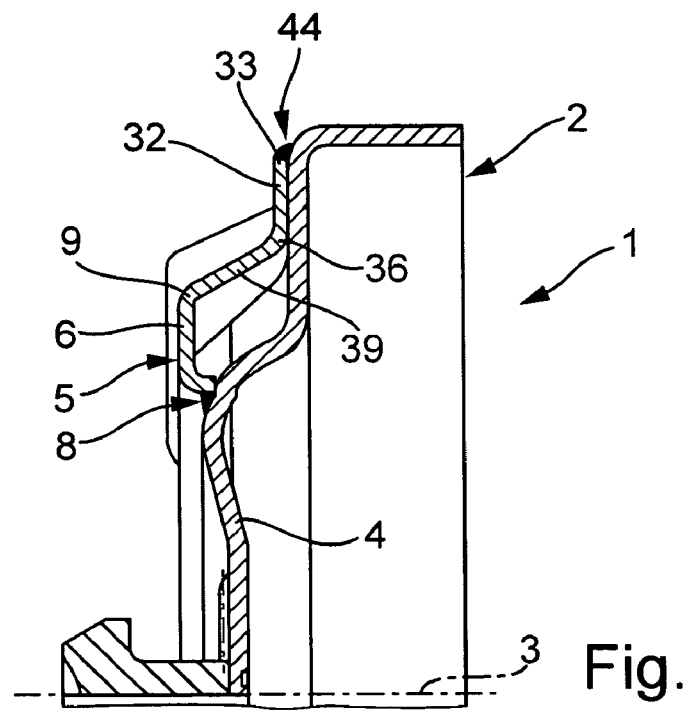
FIG. 3 is a partial cross-sectional view along line II-II in FIG. 1 according to a second embodiment; and, FIG. 4 is a partial cross-sectional view along line II-II in FIG. 1 according to a third embodiment.

In the embodiment example represented in FIG. 3 not only radially inner circumferential edge 8 of connecting annular disk 6 but rather also radially outer edge area 33 of fastening flange 32 are welded to housing wall 4 which is on the driving side, as is indicated by weld seam 44.

Figure 4:
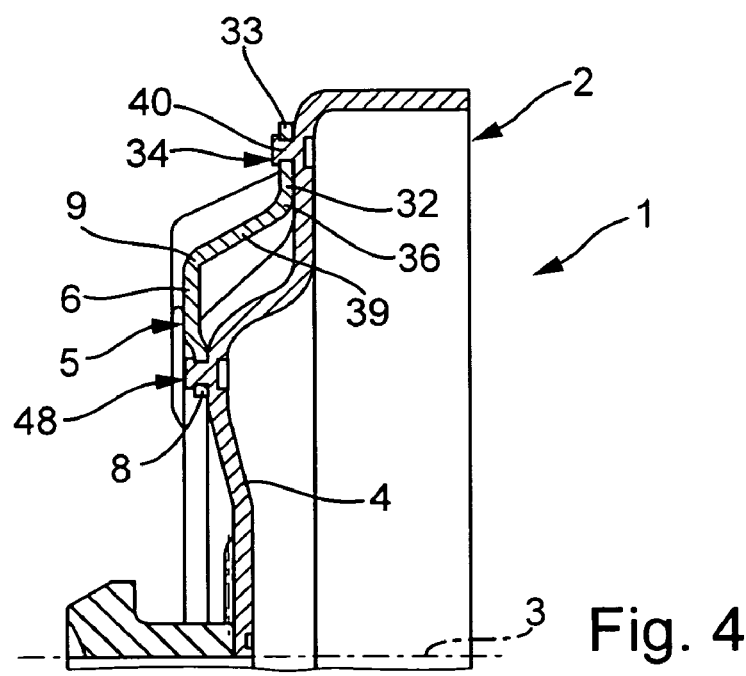

In the embodiment example represented in FIG. 4 in comparison to the embodiment example represented in FIG. 2 not only fastening flange 32 but rather also connecting annular disk 6 is welded in the vicinity of its radially inner circumferential edge 8 to housing wall 4 which is on the driving side, as is indicated by riveted stud 48.

Through the cupping, in the circumferential direction, between the mounting surfaces a clear increase in rigidity in the connecting plate can be achieved. The cupping is preferably implemented as a bevel. The realization according to the invention has with respect to completely closed and cupped connecting plates a lower weight and a lower mass moment of inertia. The embodiment examples represented in FIGS. 2 and 4 with a rivet connection between the connecting plate and the housing wall which is on the driving side offer additional advantages since the riveted studs set out from the housing wall which is on the driving side according to one aspect of the present invention serve to center the connecting plate. The connection of the nut will preferably already have been done before the mounting of the connecting plate since the realization according to the invention has less weld distortion than in the case of traditional realizations. Due to the lesser weld distortion the thickness of the connecting plate can also be reduced.

LIST OF REFERENCE NUMBERS

1 Hydrodynamic torque converter
2 Housing
3 Axis of rotation
4 Housing wall, which is on the driving side
5 Connecting plate
6 Connecting annular disk
8 Radially inner circumferential edge
9 Radially outer circumferential edge
11 Mounting surface
12 Mounting surface
13 Mounting surface
14 Through hole
15 Nut
17 Cupping surface
18 Cupping surface
19 Cupping surface
20 Cupping surface
22 Fastening flange
23 Radially outer edge area
24 Connection point
25 Connection point
26 Radially inner edge area
30 Cupping surface
32 Fastening flange
33 Radially outer edge area
34 Connection point
35 Connection point
36 Radially inner edge area
37 Cupping surface
38 Partial circle
40 Riveted stud
44 Weld seam
48 Riveted stud

What is claimed is:

1. A hydrodynamic torque converter comprising:
a housing (2) having a wall (4) on a driving side, where a connecting plate (5) is fastened to the housing wall, wherein the connecting plate (5) has several mounting locations (11, 12, 13) distributed over a circumference of the connecting plate (5) for connecting the hydrodynamic torque converter (1) to a drive unit, wherein in a mounted state the torque converter (1) is fastened at corresponding mounting locations of the drive unit; and, wherein for each two mounting locations (11, 12, 13) the connecting plate (5) having a fastening area (22, 32) with which the connecting plate (5) is fastened to the housing wall (4) on the driving side between the two mounting locations in a circumferential direction, and wherein a connecting annular disk (6) is connected as one piece to the fastening flange (22, 32) by an additional cupping surface (30, 37).

2. The hydrodynamic torque converter according to claim 1, wherein the mounting locations each comprise at least one of the mounting surface (11, 12, 13), the mounting surface being spaced from the housing wall (4) which is on the driving side and extending radially outwards from a connecting annular disk (6).

3. The hydrodynamic torque converter according to claim 2, wherein two preferably oblique cupping surfaces (17, 18, 19, 20) run out from the mounting surface (11, 12, 13) laterally in the circumferential direction, the cupping surfaces each becoming a fastening flange (22, 32) and extending, in the circumferential direction, between the two mounting surfaces (11, 12, 13).

4. The hydrodynamic torque converter according to claim 3, wherein radially outwards the fastening flange (22, 32) is welded to the housing wall (4) on the driving side.

5. The hydrodynamic torque converter according to claim 3, wherein the fastening flange (22, 32) is connected by rivets to the housing wall (4) on the driving side.

6. The hydrodynamic torque converter according to claim 2, wherein the connecting plate (6) is spaced in the axial direction from the housing wall (4) on the driving side.

7. The hydrodynamic torque converter according to claim 6, wherein radially inwards the connecting annular disk (6) is welded to the housing wall (4) on the driving side.

8. The hydrodynamic torque converter according to claim 6, wherein the connecting annular disk (6) is connected by rivets to the housing wall (4) on the driving side.

9. The hydrodynamic torque converter according to claim 2, wherein between the mounting surface (11, 12, 13) and the housing wall (4), which is on the driving side, a nut is fastened to the connecting plate (5).

10. A hydrodynamic torque converter comprising:
a housing (2) having a wall (4) on a driving side, where a connecting plate (5) is fastened to the housing wall, wherein the connecting plate (5) has several mounting locations (11, 12, 13) distributed over a circumference of the connecting plate (5) for connecting the hydrodynamic torque converter (1) to a drive unit, wherein in a mounted state the torque converter (1) is fastened at corresponding mounting locations of the drive unit; and, wherein for each two mounting locations (11, 12, 13) the connecting plate (5) having a fastening area (22, 32) with which the connecting plate (5) is fastened to the housing wall (4) on the driving side between the two mounting locations in a circumferential direction, wherein two oblique cupping surfaces (17, 18, 19, 20) run out from the mounting surface (11, 12, 13) laterally in the circumferential direction, the cupping surfaces each becoming a fastening flange (22, 32) and extending, in the circumferential direction, between the two mounting surfaces (11, 12, 13).

* * * * *